(12) United States Patent
Gogolla et al.

(10) Patent No.: US 10,502,566 B2
(45) Date of Patent: Dec. 10, 2019

(54) METHOD FOR EXAMINING OBJECT PROPERTIES OF AN OBJECT IN A SUBSTRATE

(71) Applicant: Hilti Aktiengesellschaft, Schaan (LI)

(72) Inventors: Torsten Gogolla, Schaan (LI); Dietmar Schoenbeck, Goefis (AT); Sascha Korl, Louisville, CO (US); Jens Neumann, Grabs (CH)

(73) Assignee: Hilti Aktiengesellschaft, Schaan (LI)

( * ) Notice: Subject to any disclaimer, the term of this patent is extended or adjusted under 35 U.S.C. 154(b) by 207 days.

(21) Appl. No.: 15/539,023

(22) PCT Filed: Dec. 22, 2015

(86) PCT No.: PCT/EP2015/080974
§ 371 (c)(1),
(2) Date: Jun. 22, 2017

(87) PCT Pub. No.: WO2016/102564
PCT Pub. Date: Jun. 30, 2016

(65) Prior Publication Data
US 2017/0370721 A1    Dec. 28, 2017

(30) Foreign Application Priority Data
Dec. 23, 2014  (EP) .................... 14200036

(51) Int. Cl.
*G01C 15/02* (2006.01)
*G01C 15/00* (2006.01)
(Continued)

(52) U.S. Cl.
CPC .......... *G01C 15/006* (2013.01); *G01B 11/002* (2013.01); *G01C 3/06* (2013.01); *G01C 15/002* (2013.01); *G01V 3/15* (2013.01)

(58) Field of Classification Search
CPC ............................ G01C 15/006; G01C 15/105
(Continued)

(56) References Cited

U.S. PATENT DOCUMENTS 4,691,446 A * 9/1987 Pitches ................... G01S 17/87
33/1 CC
6,064,940 A    5/2000 Rodgers et al.
(Continued)

FOREIGN PATENT DOCUMENTS

DE        100 34 035 A1    1/2002
DE   10 2006 025 881 A1   12/2007
(Continued)

OTHER PUBLICATIONS

Russian-language Office Action issued in counterpart Russian Application No. 2017126245/28 dated May 31, 2018 (two (2) pages).
(Continued)

*Primary Examiner* — Christopher W Fulton
(74) *Attorney, Agent, or Firm* — Crowell & Moring LLP

(57) ABSTRACT

A method for examining object properties of an object in a substrate, using an arrangement that comprises a detector device, a localization device, and a control device is provided. The method includes selecting a first object having first object properties to be examined and first target coordinates and also includes determining an actual position of the detector device using the localization device. Moreover, the method includes determining by the control device an actual detection field from the actual position of the detector device, and comparing by the control device the first target coordinates with the actual detection field of the detector device.

16 Claims, 5 Drawing Sheets

(51) Int. Cl.
*G01V 3/15* (2006.01)
*G01B 11/00* (2006.01)
*G01C 3/06* (2006.01)

(58) Field of Classification Search
USPC .................................. 33/1 CC, 228; 348/745
See application file for complete search history.

(56) References Cited

U.S. PATENT DOCUMENTS

| | | | |
|---|---|---|---|
| 6,172,742 B1* | 1/2001 | Yamazaki | G01C 15/006 356/141.4 |
| 6,373,244 B1 | 4/2002 | Nipp | |
| 6,588,868 B1 | 7/2003 | Skultety-Betz | |
| 7,113,289 B1* | 9/2006 | Beary | G01S 3/784 356/620 |
| 7,168,174 B2* | 1/2007 | Piekutowski | E01C 19/006 33/1 CC |
| 9,686,532 B2* | 6/2017 | Tohme | G01C 15/002 |
| 9,945,938 B2* | 4/2018 | Markendorf | G01S 17/023 |
| 2002/0005789 A1 | 1/2002 | Waibel et al. | |
| 2009/0106988 A1* | 4/2009 | Cobb | B64F 5/10 33/1 BB |
| 2010/0026508 A1 | 2/2010 | Krapf et al. | |
| 2012/0130675 A1* | 5/2012 | Schorr | G01C 15/105 702/154 |
| 2012/0158297 A1 | 6/2012 | Kim et al. | |
| 2012/0203502 A1* | 8/2012 | Hayes | G01C 15/002 702/155 |
| 2013/0184938 A1 | 7/2013 | Dolinar et al. | |
| 2016/0057400 A1* | 2/2016 | Winter | G01C 15/004 348/745 |
| 2016/0282230 A1* | 9/2016 | Poser | G06Q 10/06 |
| 2017/0370720 A1* | 12/2017 | Gogolla | G01V 3/15 |

FOREIGN PATENT DOCUMENTS

| | | |
|---|---|---|
| DE | 20 2009 017 424 U1 | 6/2010 |
| DE | 20 2010 016 564 U1 | 3/2011 |
| EP | 0 952 465 A2 | 10/1999 |
| EP | 1 022 542 A1 | 7/2000 |
| RU | 2551396 C1 | 5/2015 |
| WO | WO-2008119584 A1 * 10/2008 ........... G01C 15/006 |
| WO | WO 2009/009180 A2 | 1/2009 |
| WO | WO 2011/100535 A1 | 8/2011 |

OTHER PUBLICATIONS

Russian-language Examination report issued in counterpart with Russian Application No. 2017126245/28 dated Jun. 9, 2018 (five (5) pages).
Russian-language Search Report issued in counterpart Russian Application No. 2017126251/28 dated May 31, 2018 (2 pages).
Russian-language Examination Report issued in counterpart with Russian Application No. 2017126251/28 dated Jun. 9, 2018 (five (5) pages).
Russian-language Office Action issued in counterpart Russian Application No. 2017126248/28 dated May 31, 2018 (two (2) pages).
International Search Report (PCT/ISA/210) issued in PCT Application No. PCT/EP2015/081102 dated Feb. 11, 2016 with English translation (5 pages).
German-language Written Opinion (PCT/ISA/237) issued in PCT Application No. PCT/EP2015/081102 dated Feb. 11, 2016 with English translation (11 pages).
International Search Report (PCT/ISA/210) issued in PCT Application No. PCT/EP2015/080974 dated Mar. 21, 2016 with English translation (5 pages).
German-language Written Opinion (PCT/ISA/237) issued in PCT Application No. PCT/EP2015/080974 dated Mar. 21, 2016 with English translation (11 pages).
International Search Report (PCT/ISA/210) issued in PCT Application No. PCT/EP2015/080983 dated Apr. 14, 2016 with English translation (5 pages).
German-language Written Opinion (PCT/ISA/237) issued in PCT Application No. PCT/EP2015/080983 dated Apr. 14, 2016 with English translation (10 pages).
Farr et al., "Three Dimensional Indoor Survey System", ANS Topical Meeting on Decommissioning, Decontamination, and Reutilization, Aug. 7, 2005, Denver, Colorado, four (4) pages total, XP055197179.

* cited by examiner

METHOD FOR EXAMINING OBJECT PROPERTIES OF AN OBJECT IN A SUBSTRATE

This application claims the priority of International Application No. PCT/EP2015/080974, filed Dec. 22, 2015, and European Patent Document No. 14200036.3, filed Dec. 23, 2014, the disclosures of which are expressly incorporated by reference herein.

BACKGROUND AND SUMMARY OF THE INVENTION

The present invention relates to a method for examining object properties of an object in a substrate.

A known apparatus for detecting objects in a substrate is disclosed in DE 20 2010 016 564 U1. The apparatus includes a detector device, a localization device, and a control device. The user moves the detector device over the boundary surface, wherein the detector device executes a series of measurements. During the measurement process, the localization device determines the current position of the detector device on a regular basis. The measurement data of the detector device and the position data of the localization device are transmitted to the control device, which allocates and stores the measurement and position data. The measurement and location data can be further processed by the control device and depicted on a screen, for example.

The object of the present invention is directed to a method for examining object properties of an object in a substrate.

According to one or more embodiments of the invention, the method for examining object properties of an object in a substrate by an apparatus, which includes a detector device, a localization device, and a control device, is as follows:

In a first step, one selects a first object having at least a first object property to be examined and first target coordinates, In a second step, a current position of the detector device in the space is determined using the localization device, In a third step, a current detection field is determined by the control device from the current position of the detector device, and In a fourth step, the first target coordinates are compared by the control device against the current detection field of the detector device.

The method according to the invention deals with examining the object properties of a known object using a detector device. The term "object" includes all elements that may be located in a substrate. Examples of objects, which are detected by the detector device, are power lines, broadcast cables, empty pipes, water lines, heating pipes, and reinforcing bars. For a water line, the material (copper or plastic), the diameter, the position, and use as a hot- or cold-water line are some of the object properties that can be examined. For a power line, the material, the distance and the position to other types of lines, and use as a high- or low-voltage electric cable, among other things, are object properties that can be examined by a detector device. For the embedding of reinforcing bars in concrete ceilings, one can examine whether the stated quantity of reinforcing bars was embedded and whether the optimal distances according to the latest technology were complied with between the reinforcing bars.

A necessary prerequisite for the method according to the invention is that the target coordinates of the object to be examined are known. The target coordinates may be on hand as absolute coordinates or relative coordinates in relation to a reference object. Of particular relevance to the application is the ability to check the information of a construction plan using the method according to the invention. A construction plan contains a plurality of objects with their object properties and target coordinates. The construction plan may be designed for the control device in a legible format to enable uploading the object data directly from the construction plan; otherwise, the object data must be entered manually by the user into the control device.

In a first step of the method according to the invention, one selects a first object to be examined having the associated first target coordinates and one establishes the object properties to be examined of the first object. Before a measurement is taken with the detector device, for a point detector the detector device must be positioned over the first object, and for a scanning detector, it must be moved over the object.

In addition, in a second step and by way of the localization device, the current position of the detector device is determined in the space. In a third step, the control device determines from the current position of the detector device the current detection field of the detector device; the relationship between the current position and the detection field of the detector device is known. For scanning detectors, the detection field corresponds to the local scan region about the object. Then in a fourth step of the method, the first target coordinates are compared by the control device against the current detection field of the detector device.

The subsequent steps of the method according to the invention depend on the comparison of the first target coordinates of the first object against the current detection field of the detector device. One thereby differentiates between three variants: In a first variant, the first object is located within the current detection field; in a second variant, the first object is located at least partially outside of the current detection field; and in a third variant, the dimensions of the first object are greater than the current detection field of the detector device.

In the first variant of the method, at least one measurement is performed in the substrate using the detector device, if the first target coordinates of the first object are located within the current detection field. The method according to the invention has the advantage that the control device automatically actuates a measurement or a series of measurements in the substrate by the detector device.

In a particularly preferred embodiment, the measurement of the detection device is taken with detection parameters, which are adapted to the first object properties to be examined of the first object. Due to the fact that the object properties of the first object are known, the detection parameters with which the detector device takes one or more measurements can be adapted to the object properties to be examined. Taking measurements with adapted detection parameters increases the accuracy and reliability of the measurement results.

In the second variant of the method, from the current position of the detector device and the first target coordinates of the first object, an adjustment instruction for the detector device is calculated by the control device and depicted on a display device if the first target coordinates of the first object are located at least partially outside of the current detection field. The second to fourth steps of the method according to the invention are repeated at regular intervals while the detector device moves until the first target coordinates of the first object are located within the current detection field of the detector device.

In the third variant of the method, an adjustment instruction for the detector device is calculated by the control device and depicted on the display device, and during the movement, a series of measurements in the substrate are taken by the detector device, if the first target coordinates of the first object are located partially within the current detection field and the dimensions of the first object are greater than the current detection field. The third variant is relevant for objects whose dimensions exceed the size of the detection field, such as power lines, water lines, and reinforcing bars, for example.

In a preferred embodiment of the method, the control device simultaneously starts the substrate measurement using the detector device and the position determination using the localization device. By the simultaneous start of the position determination and the substrate measurement, the localization device and the detector device are synchronized. Since the measurement periods for the position determination using the localization device and the substrate measurement using the detector device generally differ from each other, the position values and the measurement results are not determined simultaneously. Through synchronization, the measured position values and measurement results of the substrate measurement can be allocated to each other. The closer together the points are in time for position determination and substrate measurement, the smaller is the error in the position coordinates.

In a further embodiment, the method according to the invention, in the first step, one selects besides the first object a second object with second object properties to be examined and second target coordinates, and in the fourth step, besides the first target coordinates of the first object, one compares the second target coordinates of the second object against the current detection field of the detector device. The method has the advantage that multiple objects can be examined by the detector device.

The additional method steps of the method according to the invention depend on the comparison of the first target coordinates of the first object and the second target coordinates of the second object against the current detection field of the detector device. One thereby differentiates between three variants: In a first variant, one of the two objects is located within the detection field; in a second variant, both objects are located within the detection field; and in a third variant, both objects are located outside of the detection field.

In the first variant, the detector device performs at least one measurement in the substrate, if the first target coordinates of the first object or the second target coordinates of the second object are located within the current detection field of the detector device. In a particularly preferred embodiment, the at least one measurement by the detector device is thereby performed with detection parameters, which are adapted to the object properties of the object located within the current detection field. The measurement with the adapted detection parameters increases the accuracy and reliability of the measurement results obtained by the detector device.

In a particularly preferred embodiment, after the substrate measurement using the detector device, an adjustment instruction for the detector device is calculated by the control device from the current position of the detector device and the target coordinates of the object located outside of the current detection field, and is depicted on a display device. The second to fourth steps of the method according to the invention are repeated at regular intervals during the movement of the detector device until the additional object is also located within the current detection field of the detector device and a measurement using the detector device can be taken.

In the second variant, the detector device takes at least one measurement in the substrate if the first target coordinates of the first object and the second target coordinates of the second object are located within the current detection field of the detector device.

In a particularly preferred embodiment, the detector device takes a first measurement with first detection parameters, which are adapted to the first object properties of the first object, and a second measurement with second detection parameters, which are adapted to the second object properties of the second object. For objects with different object properties, for example different materials or depths in the substrate, the optimal detection parameters may differ greatly from one another. Multiple measurements using respectively adapted detection parameters can improve the accuracy of the measurement results.

In the third variant, a first distance and a second distance are calculated by the control device from the current position of the detector device as well as the first target coordinates of the first object and the second target coordinates of the second object, if the first target coordinates of the first object and the second target coordinates of the second object are located outside of the current detection field of the detector device. The first distance represents the difference of the first object to the current position of the detector device, and the second distance corresponds to the difference of the second object to the current position of the detector device.

In a particularly preferred embodiment, the first distance and the second distance are compared against each other by the control device, and for the object with the smaller distance to the current position of the detector device, an adjustment instruction for the detector device is calculated by the control device and depicted on a display device.

In a further embodiment, the method according to the invention, in a second step, a current orientation of the detector device, in addition to the current position of the detector device, is also determined by the localization device. In a particularly preferred embodiment, in the third step, the current detection field of the detector device is determined by the control device from the current position and the current orientation of the detector device. By determining the current orientation, the accuracy with which the orientation of the detector device can be determined is increased. The current orientation of the detector device can be determined for example using a camera or by the differentiation among multiple known markings, which are applied on the detector device.

Here, all known methods are suited for determining the orientation of an object in the room.

Preferably, the current orientation of the detector device is also taken into account in all method steps of the method according to the invention which use the current position of the detector device.

Embodiments of the invention are described below by the drawing(s). It is intended to show the embodiments not necessarily to scale; rather the drawing, where useful for explanation purposes, is executed in a schematic and/or slightly distorted manner. Regarding amendments to the teachings directly evident from the drawing, one shall refer to the relevant prior art. In doing so, one shall take into account that diverse modifications and changes pertaining to the form and detail of an embodiment can be undertaken without departing from the general idea of the invention. The features of the invention disclosed in the description, drawing, and claims may be essential both individually on their own as well as in any combination for the further development of the invention. Also falling within the scope of the invention are all combinations of at least two of the features disclosed in the description, drawing, and/or claims. The general ideal of the invention is not restricted to the exact form or detail of the preferred embodiments depicted and described hereafter, or limited to a subject matter that would be restricted in comparison to the subject matter claimed in the claims. For given measurement ranges, values lying within the mentioned limits shall be disclosed as limit values and one shall be able to use and claim these as one wishes. For the sake of simplicity, the same reference signs are used for identical or similar parts, or parts with an identical or similar function.

DETAILED DESCRIPTION OF THE DRAWINGS

Figure 1:
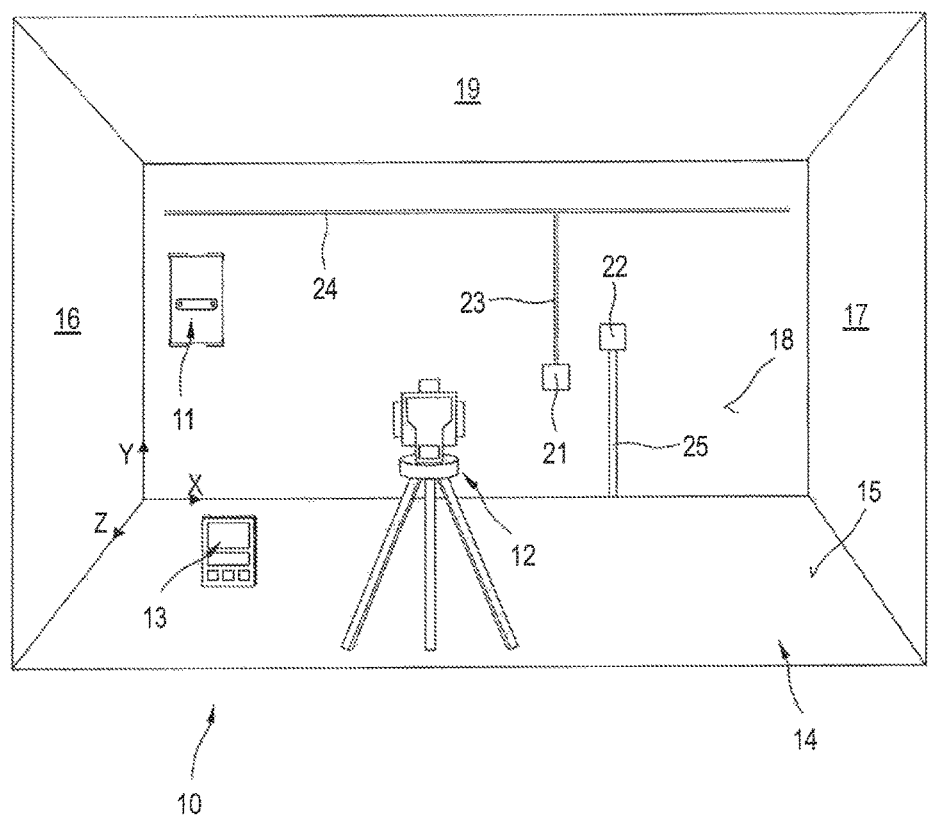
FIG. 1 illustrates the application of an apparatus for examining object properties of an object in a substrate using a detector device, a localization device, and a control device.

FIG. 1 illustrates a device 10 for executing the method according to the invention for examining object properties of an object in a substrate. The term "object" covers all elements that are located in a substrate.

Apparatus 10 includes a detector device 11, a localization device 12, and a control device 13. Detector device 11, localization device 12, and control device 13 are designed as separate components, which can be connected via communication lines and which can communicate with each other. However, control unit 13 can also be integrated in detection device 11. Detector device 11 is designed as a hand-guided detector device that is moved over the substrate during the measuring process.

In regard to detector devices, one differentiates between held and guided detector devices; a held detector device is held over the substrate to be detected during the measurement process without any forward movement, and a guided detector device is guided during the measuring process along a linear path or in any desired path over the substrate to be detected. A handheld or hand-guided detector device refers to one that the user holds or guides by hand over the substrate to be detected. The design as a held or guided detector device depends among other things on the dimensions of the objects to be examined; for elongated objects, such as power lines, water lines, or reinforcing bars, generally multiple measurements must be taken to fully detect the objects.

The method according to the invention is described by a measurement task in an interior space 14. Interior space 14 consists of a floor 15, a left and right sidewall 16, 17, a back wall 18 and a ceiling 19. The boundaries 15-19 of interior space 14 are covered by the term "boundary surface." Interior space 14 is spanned by a three-dimensional coordinate system X, Y, Z, whose point of origin (0, 0, 0) is located in the left bottom corner between floor 15, left sidewall 16, and back wall 18. A kitchenette with electrical devices is planned along back wall 18. To supply the electrical devices (with power and water), electrical and water connections, which are arranged in back wall 18, are required. A baking oven with a steam function requires a power connection 21 and a water connection 22. Power connection 21 is connected to a horizontally running power line 24 via a vertical power line 23, and water connection 22 is supplied (with water) via a water line 25.

For the measuring task, vertical power line 23 is defined as the first object and water line 25 is defined as the second object. Regarding power line 23, the material, the distance to other power supply lines, and the use as a high- or low-voltage cable can be object properties to be examined, which are to be examined by detector device 11. In regard to water line 25, the material (copper or plastic), the diameter, the position, and use as a hot- or cold-water line are some of the object properties, which can be examined by the detector device 11.

A prerequisite for the method according to the invention is that the target coordinates of the object to be examined are known. The target coordinates may be contained in a construction plan. A construction plan refers to a technical drawing of a construction project, in which all information required for making an object is depicted. As an overall plan, the construction plan may include all objects of interior space 14, or as a sub-plan it can contain only a few objects. Various objects and object properties in a construction plan are relevant for various tradesmen, such as electricians, masons, and installers.

Figure 2:
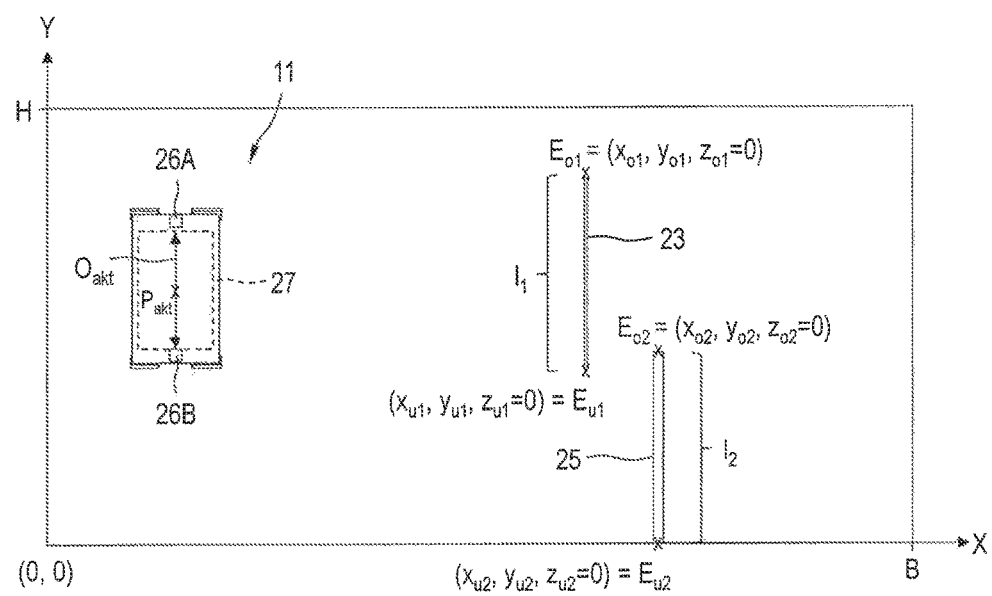
FIG. 2 illustrates the back wall of interior space of FIG. 1 with a first object to be examined and a second object to be examined.

FIG. 2 illustrates back wall 18 of interior space 14 with first object 23 to be examined and second object 25 to be examined, which are located in back wall 18. Back wall 18 lies in the XY plane of the coordinate system and it has a width B in direction X and a height H in direction Y.

Before a measurement is taken using detector device 11, detector device 11 must be positioned over first object 23, second object 25, or first and second objects 23, 25. To do so, using localization device 12, current position $P_{akt}$ is determined using coordinates $x_{akt}$, $y_{akt}$, $z_{akt}$ of detector device 11 in interior space 14. Current position $P_{akt}$ of detector device 11 is determined using two localization marks 26A, 26B. In the embodiment, localization marks 26A, 26B are applied to the top side of detector device 11. From the current position of detector device 11, control device 13 determines a current detection field 27 of detector device 11. There is a known relationship between the positions of localization marks 26A, 26B and detection field 27 of detector device 11. A current orientation $O_{akt}$ of detector device 11 may also be determined using localization marks 26A, 26B.

After control device 13 has determined current detection field 27 of detector device 11, target coordinates of objects 23, 25 are compared by control device 13 against current detection field 27 of detector device 11. The target coordinates of the objects to be examined can exist in various forms. For elongated objects, such as power line 23 and water line 25, it is advantageous to provide as target coordinates at least one end point, the length of the object, and the orientation of the object. Power line 23 has an upper end point $E_{o1}$ having coordinates $x_{o1}$, $y_{o1}$, $z_{o1}$ and a length $l_1$; it is oriented as a vertical power line parallel to the direction Y. Water line 25 has an upper end point $E_{o2}$ having coordinates $x_{o2}$, $y_{o2}$, $z_{o2}$ and a length $l_2$ and an orientation parallel to direction Y. As an alternative to the upper end points $E_{o1}$, $E_{o2}$ of objects 23, 25, lower end points $E_{u1}$, $E_{u2}$ can be provided.

Figure 3:
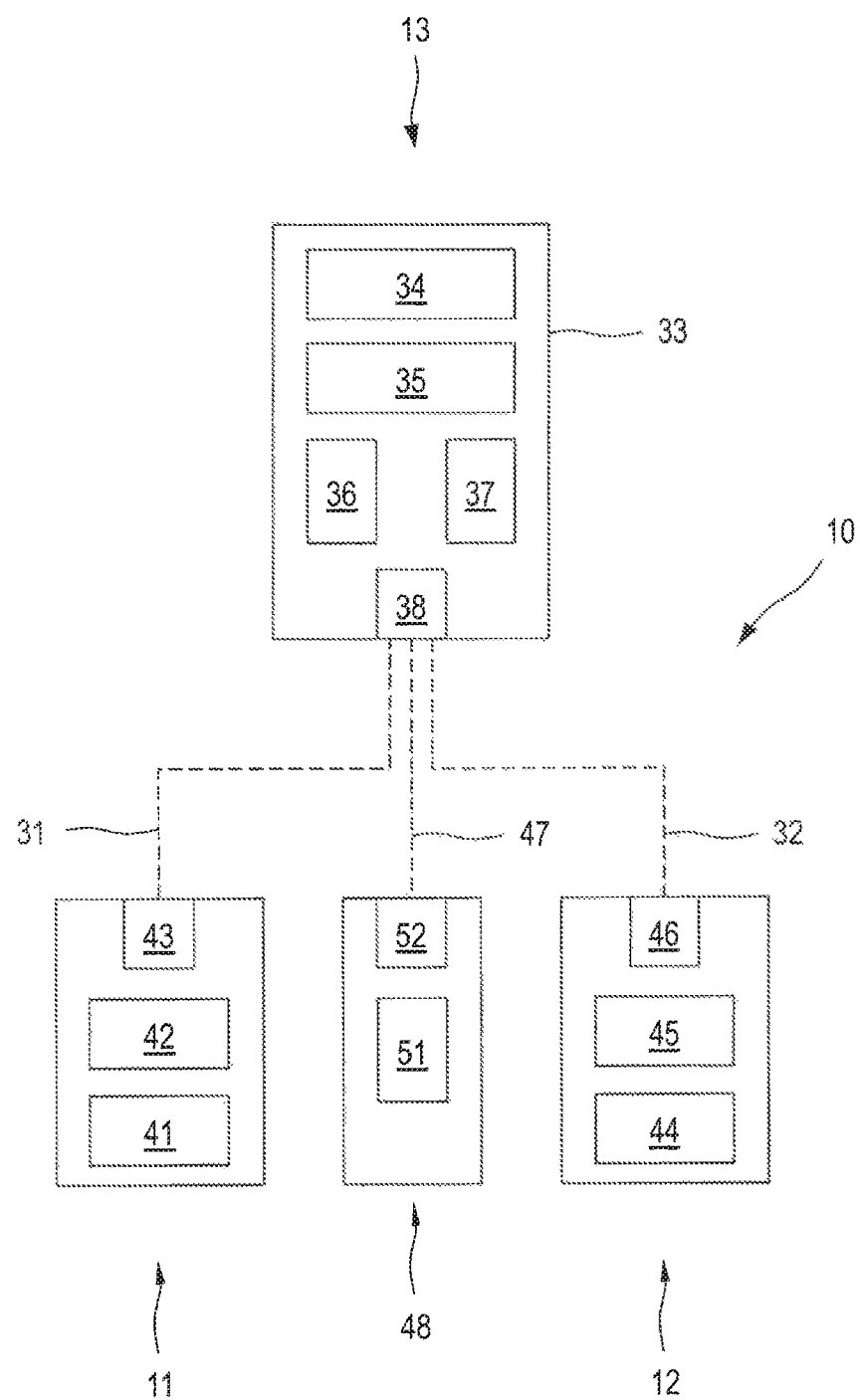
FIG. 3 illustrates the interaction of the detector device, the localization device, and the control device of the apparatus depicted in FIG. 1 in the form of a block diagram.

FIG. 3 illustrates the setup and interaction of detector device 11, localization device 12, and control device 13 in the form of a block diagram. Detector device 11, localization device 12, and control device 13 are designed in the embodiment as separate components, which can communicate with each other via communication links.

Detector device 11 and control device 13 can be connected to each other via a first communications link 31. Control device 13 can be connected to localization device 12 via a second communications link 32. The communication links can be designed as wireless communication links, for example as radio, infrared, Bluetooth, WLAN, or Wi-Fi links, or as cabled communication links. Besides the listed wireless link technologies, all already known and future wireless communication technologies for data and image transmission are suitable.

Control device 13 includes a housing 33, into which is integrated an operating device 34 and a display device 35. Operating device 34 and display device 35 can be designed as separate parts as shown in FIG. 3 or jointly integrated into a touch screen, for example. Control device 13 also has an evaluation and control element 36, a storage element 37, and a first transmit and receive element 38.

Detection device 11 includes a sensor device 41, a control element 42 for controlling sensor device 41 and a second transmit and receive element 43. Originating at first transmit and receive element 38 of control device 13, the first communications link to second transmit and receive element 43 of detector device 11 is set up. The commands for detector device 11 are transmitted by control device 13 via first communications link 31 to control element 42 of detector device 23. The sensor device has a single sensor element or multiple sensor elements; the sensor elements may be designed as inductive sensors, capacitive sensors, radar sensors, magnetic field sensors, or as other sensors suitable for detecting objects in substrates.

Localization device 12 includes a measuring device 44, a control and evaluation element 45 for controlling measuring device 44 and for evaluating the measured values, as well as a third transmit and receive element 46. Locator device 12 is designed for example as a total station and the measuring device 44 is designed as a distance and angle measuring device. Originating at first transmit and receive element 38 of control device 13, second communications link 32 to third transmit and receive element 46 of localization device is set up.

The construction plan may be stored in storage element 37 of control device 13. Control device 13 may be connected via a third communications link 47 to a central storage 48. The term "central storage" covers all electronic devices used for archiving data. These include, for example, servers, notebooks, computers, external hard drives, and PDAs. Via third communications link 47, construction plans can be transmitted from central storage memory 48 to control device 13 and stored in storage element 37, or processed construction plans are transmitted by control device 13 to central storage 48 and archived there.

Central storage 48 includes a storage device 51 and a fourth transmit and receive element 52. Originating from a first transmit and receive element 38 of control device 13, third communications link 47 to fourth transmit and receive element 52 of central storage 48 is set up. Data in the form of construction plans, photo and video files, and so on are transmitted by control device 13 to storage device 51 via third communications link 47.

Figure 4:
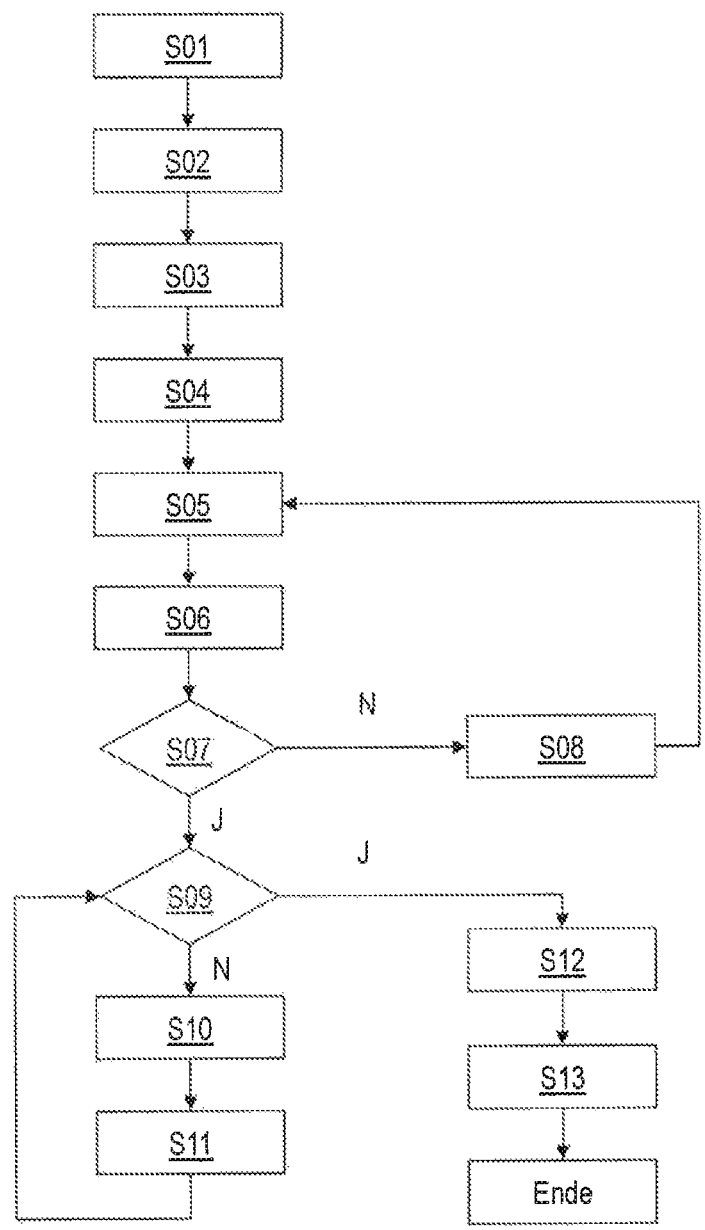
FIG. 4 illustrates a first embodiment of the method according to the invention for examining the object properties of a power line.

FIG. 4 illustrates a first design variant of the method according to the invention for examining a first object using a flow chart. The first design variant is described using a vertically running power line 23, which forms the first object to be examined and which is arranged in back wall 18 of interior space 14.

In a step S01, the user selects via operating device 34 a suitable construction plan of interior space 14, which is uploaded into control device 13. Various construction plans of interior space 14 can be stored in storage element 37 of control device 13, and the user selects a suitable construction plan. Alternatively, the user can set up third communication link 47 to central storage 48 via operating device 34, and transmit a construction plan from storage device 51 of central storage 48 to control device 13. In a step S02, the user selects power line 23 with its target coordinates ($E_{o1}$, $E_{u1}$) as the object to be examined from the construction plan and establishes the object properties to be examined of power line 23. In the embodiment, the position of power line 23 is established as being the object property to be examined.

For scanning detectors and for objects whose dimensions are greater than the dimensions of detection field 27, multiple measurements must be performed with detector device 11 and allocated to the chronologically closest position data of localization device 12 to fully detect the object; here, it is advantageous to begin the measurements at an end point of the object. As a start point for the measurement, one of the end points $E_{o1}$, $E_{u1}$ of power line 23 can be established beforehand or control device 13 decides, while the process is being executed, which end point $E_{o1}$, $E_{u1}$ of power line 23 lies closer and generates a corresponding adjustment instruction for detector device 11. In the embodiment of FIG. 4, upper end point $E_{o1}$ of power line 23 is established as being the start point for the measurements.

In a step S03, the user begins the examination of the object properties of power line 23 via operating device 34. In a step S04, localization device 12 determines current position of starting position $P_{akt}$ and current orientation $O_{akt}$ of detector device 11 on back wall 18. In step S05, current position and orientation $P_{akt}$, $O_{akt}$ of detector device 11 are transmitted by localization device 12 to control device 13. In a step S06, control device 13 determines from current position and orientation $P_{akt}$, $O_{akt}$ of detector device 11 current detection field 27 of detector device 11. Then in step S07, the target coordinates of upper end point $E_{o1}$ of power line 23 are compared by control device 13 against current detection field 27 of detector device 11. In step S07, control device 13 thereby checks whether the upper end point $E_{o1}$ of power line 23 is located within current detection field 27.

If upper end point $E_{o1}$ of power line 23 is located outside of current detection field 27 of detector device 11 (N in S07), control device 13 generates in a step SOS, from current position $P_{akt}$ of detector device 11 as well as the target coordinates of upper end point $E_{o1}$ of power line 23, an adjustment instruction for detector device 11, which is depicted on display device 35. The method according to the invention is continued with step S05. Current position and orientation $P_{akt}$, $O_{akt}$ of detector device 11 are determined by localization device 12 using a measuring frequency f; measuring frequency f is 1 Hz, for example.

If starting position $E_{o1}$ of power line 23 is located within current detection field 27 (J in S07), in a step S09 control device 13 compares the current orientation $O_{akt}$ of detector device 11 against the orientation of object 23. Since power line 23 runs parallel to direction Y, detector device 11 should be oriented correspondingly and then moved in direction Y over power line 23. For the exact detection of the position of power line 23 and particularly when using a scanning detector, generally a serpentine motion over power line 23 is required, which is depicted by an adjustment instruction of control device 13 on display device 35.

If detector device 11 is not oriented parallel to direction Y (N in S09), control device 13 generates in a step S10 for the user an adjustment instruction that is depicted on display device 35. While the user makes a turning motion with detector device 11, the current orientation of $O_{akt}$ of detector device 11 is determined in a step S11 using localization device 12, and the process is subsequently continued with step S09. If detector device 11 is oriented parallel to direction Y (J in S09), detector device 11 begins in a step S12 with the execution of a series of measurements using detection parameters, which are adapted to the object properties of power line 23. Suitable as measurement variables for power line 23 are magnetic and/or electric field strengths, for example. By allocating the measurement data of detector device 11 to the chronologically closest position data of localization device 12, the actual position and orientation of power line 23 can be determined and compared against the respect target coordinates of power line 23 by control device 13. The end of the measurements is depicted in a step S13 on display device 35.

For the first design variant of the method according to the invention, current position $P_{akt}$ of detector device 11 and current orientation $O_{akt}$ of detector device 11 are compared sequentially against the target coordinates of power line 23 in steps S07 and S09. Alternatively, current position $P_{akt}$ and current orientation $O_{akt}$ of detector device 11 can be compared against the target coordinates of power line 23 in a joint method step and then an adjustment instruction can be depicted on display device 35 for the position and orientation of detector device 11.

Figure 5:
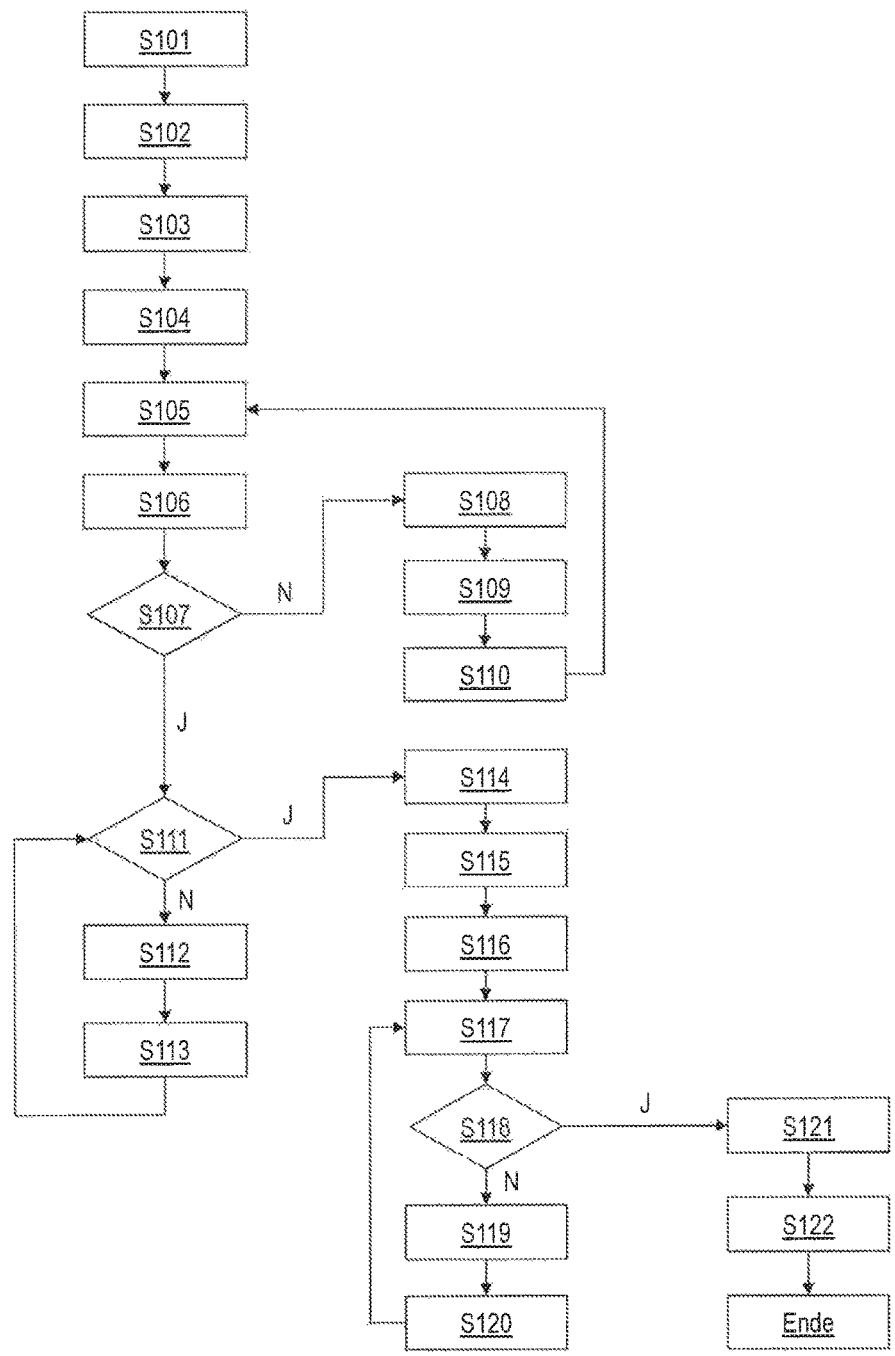
FIG. 5 illustrates a second design variant of the method according to the invention for examining the object properties of a first object designed as a power line and a second object designed as a water line.

FIG. 5 illustrates a second design variant of the method according to the invention for examining the object properties of a first object and a second object using a flow chart. The second design variant is described using power line 23, which forms the first object to be examined, and water line 25, which forms the second object to be examined. Power line 23 and water line 25 are thereby arranged in back wall 18 of interior space 14.

As a starting point for the measurements, one can establish objects 23, 25 to be examined beforehand or control device 13 decides while the method is executed which object 23, 25 lies closer and generates a corresponding adjustment instruction for detector device 11. In the embodiment of FIG. 5, the distances are determined and compared against each other. Since the target coordinates of objects 23, 25 and thus also the dimensions of objects 23, 25 are known before executing the process, it is established beforehand whether an object can be detected with one measurement or whether detector device 11 must be moved over the object and simultaneously a series of measurements must be performed. In the embodiment, length $l_1$ of power line 23 and length $l_2$ of water line 25 are greater than the dimensions of detection field 27 of detector device 11, so that multiple measurements with detector device 11 and localization device 12 must be performed to fully detect objects 23, 25. For scanning detectors, multiple measurements are required in any event.

In a step S101, the user selects a suitable construction plan of interior space 14, which is uploaded into control device 13. In a step S102, the user selects power line 23 as the first object to be examined and water line 25 as the second object to be examined from the construction plan and establishes the object properties of power line 23 and water line 25. After objects 23, 25 and the object properties to be examined were established in step S102, the user begins the examination of the object properties in step S103 using operating device 34.

In a step S104, localization device 12 determines current position $P_{akt}$ and current orientation $O_{akt}$ of detector device 11 on back wall 18. In a step S105, current position and orientation $P_{akt}$, $O_{akt}$ of detector device 11 are transmitted from localization device 12 to control device 13, which in a step S106, determines current detection field 27 from the current position and orientation of detector device 11. Subsequently in a step S107, current detection field 27 is compared by control device 13 against the target coordinates of power line 23 and the target coordinates of water line 25.

If neither an end point $E_{o1}$, $E_{u1}$ of power line 23 nor an end point $E_{o2}$, $E_{u2}$ of water line 25 are located within current detection field 27 of detector device 11 (N in S107), control device 13 calculates in a step S108 a first distance $d_1$ between power line 23 and current position $P_{akt}$ of detector device 11 as well as a second distance $d_2$ between water line 25 and current position $P_{akt}$ of detector device 11.

In a step S109, control device 13 generates for the object with the smallest distance to current position $P_{akt}$ of detector device 11 an adjustment instruction, which is depicted on display device 35, for detector device 11. While the user moves detector device 11, current position $P_{akt}$ and current orientation $O_{akt}$ of detector device 11 are determined in a step S110 using localization device 12 and the process is continued with step S105. If an end point $E_{o1}$, $E_{u1}$ of power line 23 or an end point $E_{o2}$, $E_{u2}$ of water line 25 are located within current detection field 27 (J in S107), control device 13 compares in a step S111 current orientation $O_{akt}$ of detector unit 11 against the orientation of the object located within detection field 27.

If current orientation $O_{akt}$ of detector unit 11 deviates from the orientation of the object to be examined (N in S111), control device generates in a step S112 an adjustment instruction, which is depicted on display device 35, for detector device 11. While the user turns detector device 11, current orientation $O_{akt}$ of detector unit 11 is determined in a step S113 using localization device 12 and the process is continued with step S111.

If current orientation $O_{akt}$ of detector unit 11 corresponds to the orientation of the object (J in S111), control device 13 generates in a step S114 an adjustment instruction for detector device 11 and begins a series of measurements using detector device 11; the detection parameters are thereby adapted to the object properties to be examined. The end of the measurements for the object to be examined is depicted on display device 35 in a step S115, and the process is continued for the other object to be examined.

Current position $P_{akt}$ and current orientation $O_{akt}$ of detector unit 11 are determined in a step S116 using localization device 12 and transmitted to control device 13. Control device 13 determines in a step S117 from current position and orientation $P_{akt}$, $O_{akt}$ of detector device 11 current detection field 27 and compares current detection field 27 in a step S118 against the target coordinates (end points, orientation) of the object to be examined.

If no end point of the object is located within current detection field 27 of detector device 11 and/or the orientation of the object deviates from current orientation $O_{akt}$ of detector device 11 (N in S118), control device 13 calculates in a step S119 from current position and orientation $P_{akt}$, $O_{akt}$ of detector device 11 as well as the target coordinates of the object (end points and orientation) an adjustment instruction, which is depicted on display device 35, for detector device 11. While the user moves detector device 11, current position $P_{akt}$ and orientation $O_{akt}$ of detector device 11 are determined in a step S120 using localization device 12, and the process is continued with step S117.

If an end point of the object is located within current detection field 27 of detector device 11 and the orientation of the object corresponds to actual orientation $O_{akt}$ of detector device 11 (J in S118), control device 13 generates in a step S121 an adjustment instruction for detector device 11 and begins a series of measurements using detector device 11; the detection parameters are thereby adapted to the object properties to be examined. In a step S122, the end of the measurements for the object to be examined is depicted on display device 35. The method according to the invention ends after step S122.

The invention claimed is:

1. A method for examining object properties of an object in a substrate by an apparatus, the apparatus comprises a detector device, a localization device, and a control device, the method comprising the steps of:
    selecting a first object having at least one first object property and first target coordinates;
    determining by the localization device a current position of the detector device in an interior space;
    determining by the control device a current detection field from the current position of the detector device; and
    comparing by the control device the first target coordinates against the current detection field of the detector device.

2. The method according to claim 1, further comprising the step of:
    taking by the detector device at least one measurement in the substrate if the first target coordinates of the first object are located within the current detection field.

3. The method according to claim 2, wherein the measurement by the detection device is performed with detection parameters, the detection parameters being adapted to the first object properties of the first object.

4. The method according to claim 1, further comprising the steps of:
    calculating by the control device an adjustment instruction from the current position of the detector device and the first target coordinates of the first object; and
    depicting the adjustment instruction on a display device if the first target coordinates of the first object are located at least partially outside of the current detection field.

5. The method according to claim 1, further comprising the steps of:
    calculating by the control device an adjustment instruction for the detector device;
    depicting the adjustment instruction on a display device; and
    during the movement, carrying out a series of measurements by the detector device in the substrate if the first target coordinates of the first object are located partially within the current detection field and dimensions of the first object are greater than the current detection field.

6. The method according to claim 1, further comprising the steps of:
    selecting a second object having second object properties and second target coordinates to be examined; and
    comparing by the control device the second target coordinates of the second object against the current detection field of the detector device.

7. The method according to claim 6, further comprising the step of:
    performing by the detector device at least one measurement in the substrate if the first target coordinates of the first object or the second target coordinates of the second object are located within the current detection field of the detector device.

8. The method according to claim 7, wherein the at least one measurement of the detector device is carried out with detection parameters, the detection parameters being adapted to object properties of the object located within the current detection field.

9. The method according to one of the claim 8, further comprising the steps of:
    calculating by the control device an adjustment instruction for the detector device after the measurement using the detector device from the current position of the detector device and the target coordinates of the object located outside of the current detection field; and
    depicting the adjustment instruction for the detector device on a display device.

10. The method according to claim 6, further comprising the step of:
    carrying out by the detector device at least one measurement in the substrate if the first target coordinates of the first object and the second target coordinates of the second object are located within the current detection field of the detector device.

11. The method according to claim 10, further comprising the steps of:
    performing by the detector device a first measurement with first detection parameters that are adapted to the first object properties of the first object; and
    performing by the detector device a second measurement with second detection parameters that are adapted to the second object properties of the second object.

12. The method according to claim 6, further comprising the step of:
    calculating by the control device a first distance and a second distance from the current position of the detector device and from the first and second target coordinates of the first and second objects if the target coordinates of the first and second object are located outside of the current detection field of the detector device.

13. The method according to claim 12, wherein the first and second distances are compared against each other by the control device, and further comprising the steps of:
    calculating by the control device an adjustment instruction for the detector device for the object with a smaller distance to the current position of the detector device; and
    depicting the adjustment instruction for the detector on a display device.

14. The method according to one of the claim 7, further comprising the steps of:
    calculating by the control device an adjustment instruction for the detector device after the measurement using the detector device from the current position of the detector device and the target coordinates of the object located outside of the current detection field; and
    depicting the adjustment instruction for the detector device on a display device.

15. The method according to claim 1, further comprising the step of:
   determining a current orientation of the detector device using the localization device.

16. The method according to claim 15, wherein the current detection field of the detector device is determined from the current position and current orientation of the detector device.

* * * * *